March 12, 1940.  F. C. JONES ET AL  2,193,235
FEEDER FOR POWDERED MATERIALS
Filed Jan. 27, 1937  4 Sheets-Sheet 1

INVENTORS
FRANK CECIL JONES
BY TERENCE GUILFOYLE
Paul R Ames
ATTORNEY

March 12, 1940.   F. C. JONES ET AL   2,193,235
FEEDER FOR POWDERED MATERIALS
Filed Jan. 27, 1937   4 Sheets-Sheet 2

INVENTORS
FRANK CECIL JONES
TERENCE GUILFOYLE
BY Paul R Ames
ATTORNEY

March 12, 1940.　　F. C. JONES ET AL　　2,193,235
FEEDER FOR POWDERED MATERIALS
Filed Jan. 27, 1937　　4 Sheets-Sheet 3

INVENTORS
FRANK CECIL JONES
TERENCE GUILFOYLE
BY
Paul R. Ames
ATTORNEY

March 12, 1940.  F. C. JONES ET AL  2,193,235

FEEDER FOR POWDERED MATERIALS

Filed Jan. 27, 1937  4 Sheets-Sheet 4

INVENTORS
FRANK CECIL JONES
TERENCE GUILFOYLE
BY
Paul R Ames
ATTORNEY

Patented Mar. 12, 1940

2,193,235

UNITED STATES PATENT OFFICE 2,193,235

FEEDER FOR POWDERED MATERIALS

Frank Cecil Jones, Petts Wood, and Terence Guilfoyle, Ilford, England, assignors to Phosphate Acidulating Corporation, New York, N. Y., a corporation of Delaware Application January 27, 1937, Serial No. 122,526

14 Claims. (Cl. 221—138)

This invention relates to a feeder for supplying regulated quantities of powdered materials. It is especially adapted to the substantially continuous introduction of ground or powdered phosphate rock in the production of soluble phosphate from phosphate rock, as is described, for example, in the Broadfield Patents Nos. 1,871,416 and 1,870,278.

In the feeding of phosphate rock in such a process, it is extremely important to accurately and regularly supply the ground phosphate rock to the mixer where it is agitated with sulphuric acid in the manufacture of superphosphate. One difficulty encountered in feeders heretofore used for this purpose has been that of getting ground phosphate rock to flow freely and consistently. Another difficulty has resulted from the wearing of the moving parts and particularly the measuring parts, and inaccuracy resulting therefrom.

It is an object of the present invention to avoid the above difficulties and to provide an improved feeder whereby ground or powdered materials may be supplied with accuracy and regularity. A further object is to provide an arrangement whereby the ground material will flow freely and consistently and bridging thereof is avoided. A further object is to provide an improved feeder in which the pocketing of air in the measuring cup is avoided. It is also an object to minimize the wearing of such a feeder and particularly in portions which would affect the accuracy of the feed. Other objects will become apparent.

In describing the invention particular reference will be made to its use as a feeder for powdered phosphate rock to be fed to a continuous mixer wherein it is mixed and subsequently kneaded with sulphuric acid to produce superphosphate, but it is not intended to restrict the invention to the particular embodiment or the particular use illustrated herein, it being apparent that other modifications may be employed and that it may be used in the feeding of various powdered or ground materials.

In the drawings

Figure 1:
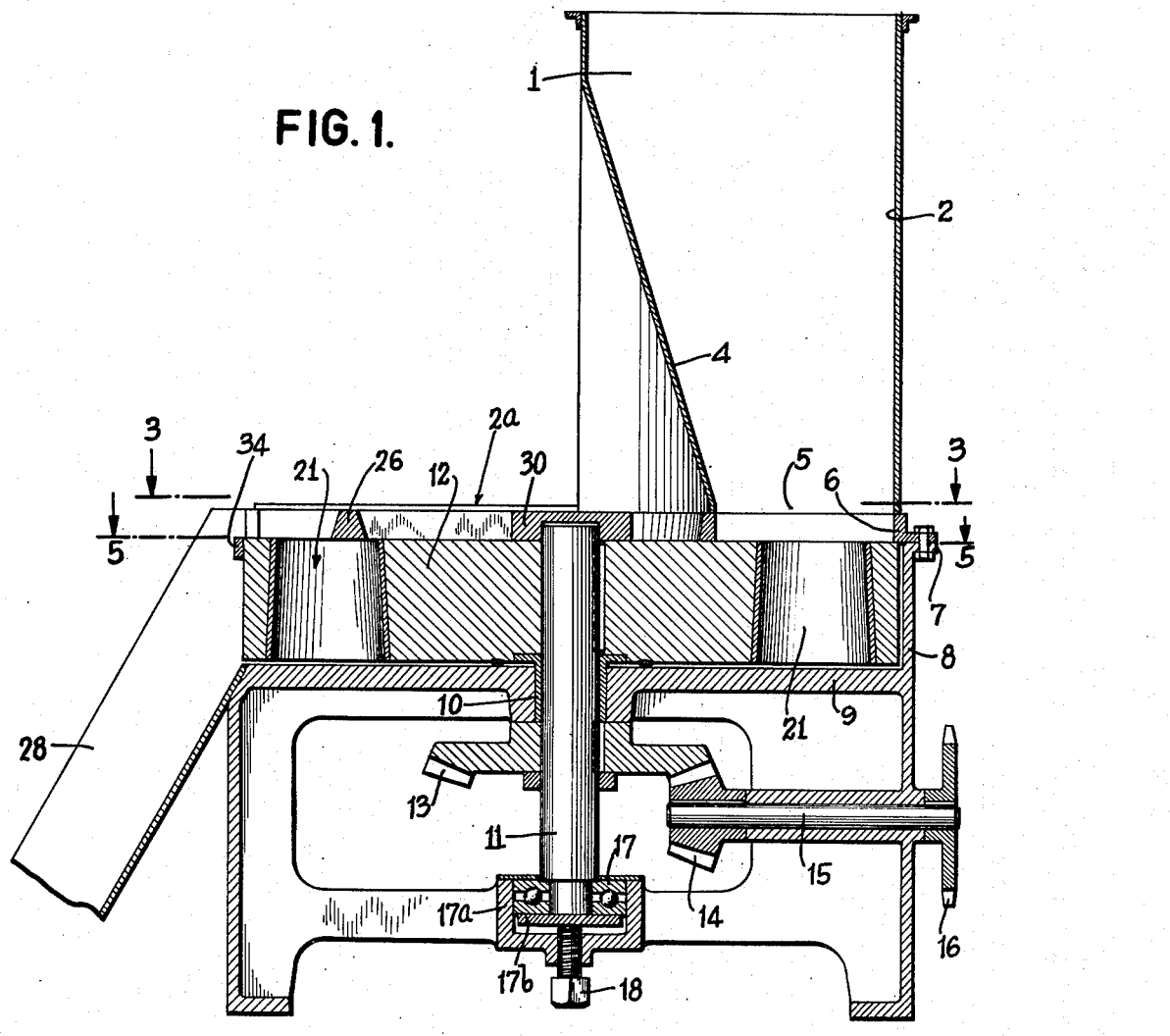
Figure 1 illustrates a cross sectional view of the feeding device, taken on the diameter opposite and extending through the middle of the overflow outlet.
Figure 3:
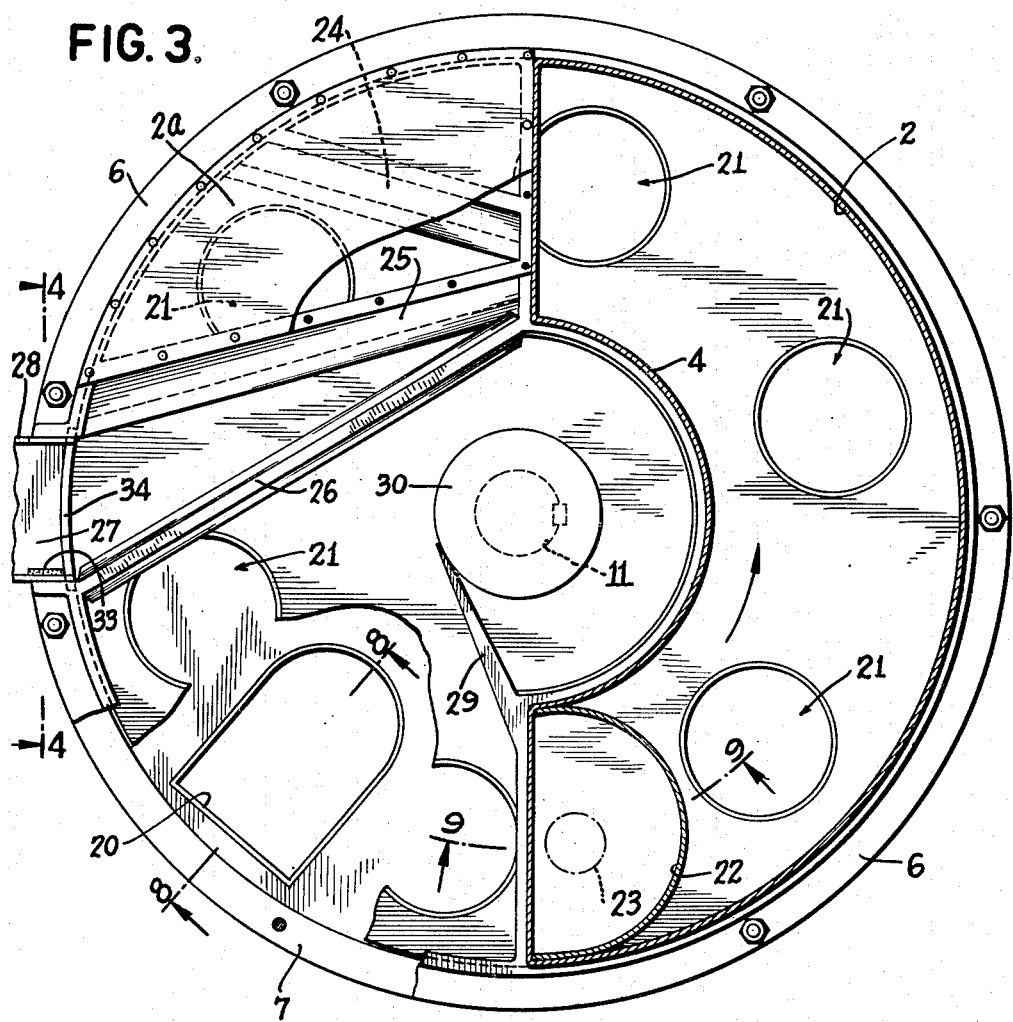

Figure 3 is a view taken on line 3—3 of Figure 1 with a portion of the measuring table broken away and with the measuring table in a slightly advanced position. Top cover plate 2a fitted over partitions 24 and 25 is also shown broken.

Figure 4:
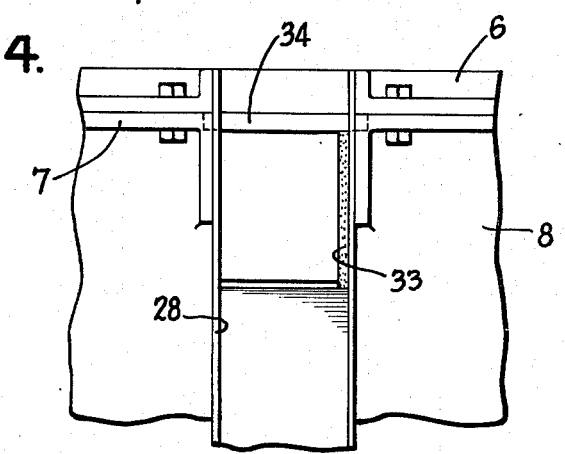

Figure 4 is a fractional enlarged side elevation taken at the left-hand side of Figure 3.

Figure 5:
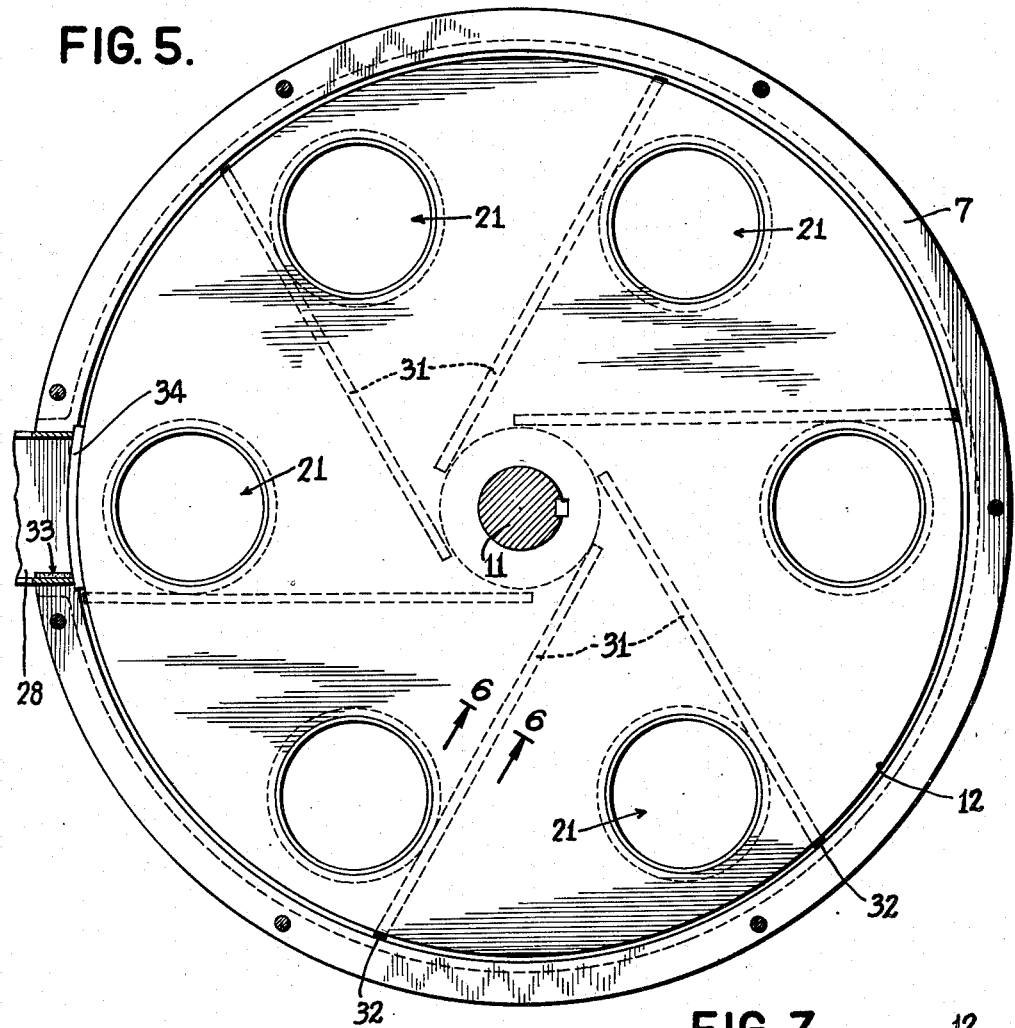

Figure 5 is a section taken on line 5—5 of Figure 1.

Figures 6, 7:
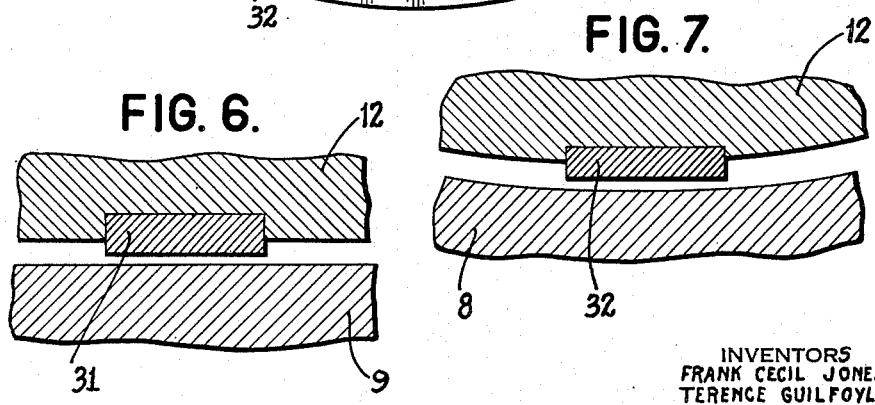

Figure 6 is a fractional enlarged vertical section of the bottom of the measuring table, taken on the line 6—6 of Figure 5.

Figure 7 is a fractional enlarged horizontal section at the edge of the measuring table.

Figure 8:
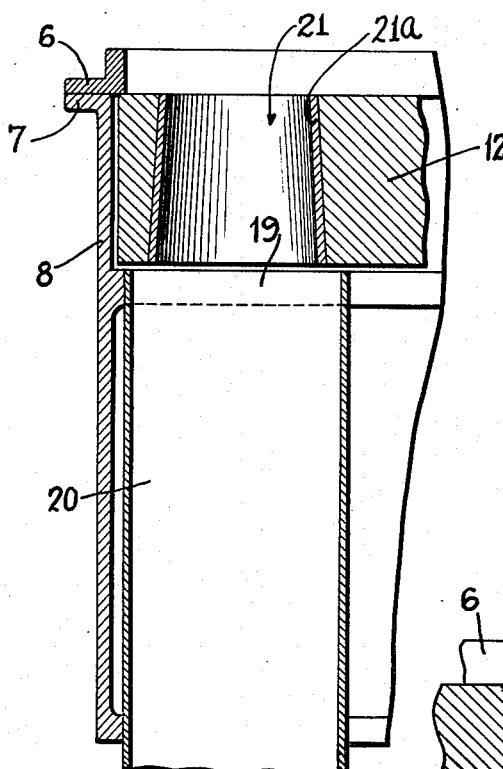

Figure 8 is a fractional vertical section on the line 8—8 of Figure 3.

Figure 9:
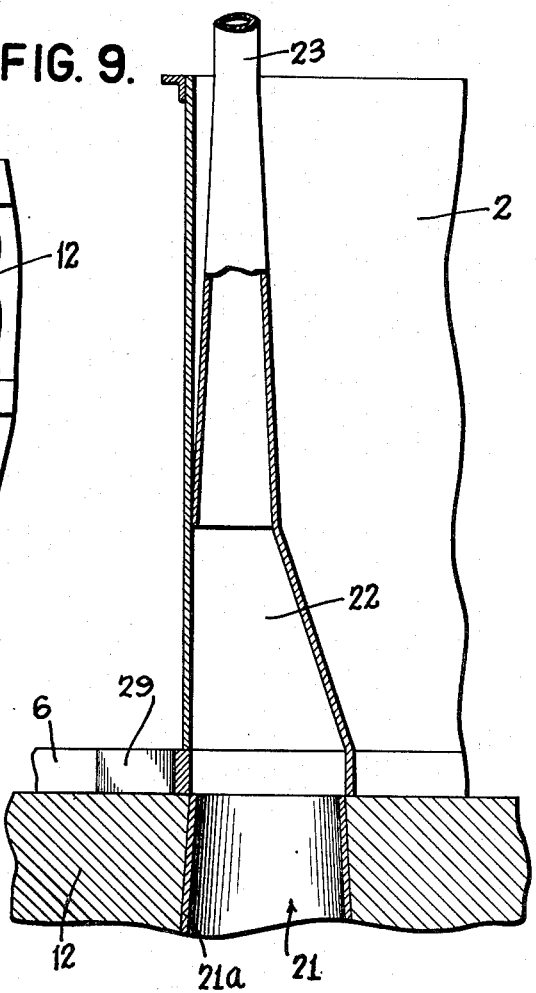

Figure 9 is a fractional vertical section on the line 9—9 of Figure 3, the upper portion of the air outlet tube being shown in elevation.

Figure 10:
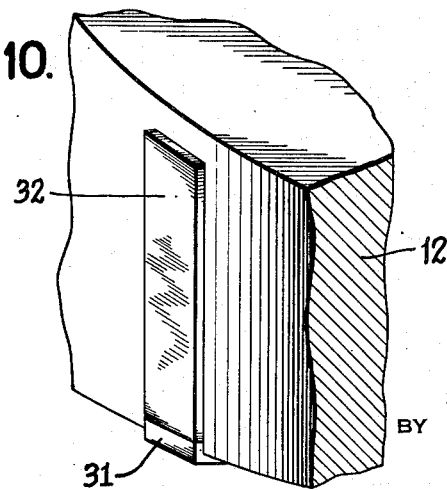

Figure 10 is a fractional enlarged perspective view of the edge of the measuring table.

The numeral 1 designates the inlet to the feed hopper 2. This hopper has a semi-circular horizontal cross-section at its upper end and has vertical outer sides with a conically shaped inner surface 4, providing a semi-annular bottom outlet 5. The hopper 2 is supported upon a top ring 6, which may be of cast or other suitable material, and which is supported upon the outwardly turned annular flange 7 of the casing 8.

The casing 8 is provided with a floor 9 providing a central bushing 10 for the vertical shaft 11, to which the measuring table 12 is keyed for rotation with said shaft. A gear 13, keyed to the shaft 11, is driven through a gear 14, keyed to the shaft 15, through a sprocket 16 also keyed to the shaft 15, or by other suitable means. The bottom of the shaft 11 is carried on the bearing 17 in the housing 17a. The bearing 17 is supported on a plate 17b which in turn is supported by the adjustment screw 18. The shaft 11 and the measuring table 12 may be vertically raised or lowered by means of the adjustment screw 18 bearing upon the bottom of the bearing support plate 17b.

The floor 9 is solid except for an opening 19 through which extends the conduit 20 for leading the measured quantities of phosphate rock to a mixer, such, for example, as that shown and described in the above mentioned patents.

The table 12 provides a solid upper and lower surface through which the measuring cups 21 extend. These measuring cups may be provided with replaceable bronze linings 21a and are tapered slightly outwardly from top to bottom in order to minimize the tendency of the powder to stick in the measuring cup and to permit free flow into the outlet conduit 20.

As shown in Figures 3 and 9, the hopper 2 is provided at the end where the cups enter with a breather 22 connected with the outlet pipe 23, whereby a vent may be provided for the air displaced from the cup as it is being filled.

In the sector preceding the discharge opening, the top ring 6 is provided with a number of slanting partitions or scraper bars 24 and 25 extending across this section as illustrated. These scraper bars are set at such an angle as to assist in the distribution of the powdered material and to progressively break down the pressure swell of the material in the filled cups as they emerge from the hopper and move toward the delivery conduit 20. The top ring 6 is also provided with a scraping device 26 adapted to finally level off the powdered material in the cups 21 and to provide for the accurate control of the quantity of powdered material carried in each measuring cup to the discharge outlet 20. This scraping device 26 is positioned at an angle such that the powder scraped from above the measuring cups 21 will be directed toward an overflow outlet 27 in the top ring 6 and casing 8. Only a small proportion of the excess powdered material remains to be scraped off the top of the table by the final scraper 26. Thus the very desirable condition is arrived at that the final levelling off by the last scraper 26 is attained without undue disturbance of the material within the cups and with complete absence of a resultant pressure swell. Other designs, shapes and sizes of scrapers 24, 25 and 26 may be desirable when other types of materials are being fed.

The overflow outlet 27 communicates with an overflow duct 28 whereby the excess powder may be conveyed to an elevator and returned to the hopper, or otherwise disposed of. The portion of the top ring 6 opposite the hopper 2 may be covered by a plate 2a to form a sealed box.

The top ring 6 is also provided with a cleaning arm 29 extending in a tapered form toward the washer plate 30 fitted over the top of the vertical driving shaft 11. This cleaning arm scrapes powder on the top surface of the table 12, toward the empty measuring cup 21, which has just passed the discharge outlet 20 and is approaching the hopper 2.

On the bottom of the table 12 there are provided a number of clearance strips 31, which in the particular example are 5/8" wide by 1/8" thick and are set into milled slots at the bottom face of the table until a raised face of 1/16" shows beyond the bottom face of the table. The screw 18 may be adjusted to provide a clearance allowance of 3/32" between the bottom surface of the table 12 and the floor 9. Thus there will be an even layer of ground phosphate rock between the table 12 and the floor 9 which will be kept alive and free from any tendency to pack by the clearance strips 31.

The outer surface of the table 12 is provided with vertically extending strips 32 between the side walls of the casing 8 and the side surface of the table 12. In the present embodiment a clearance of 3/32" is provided between the side face of the table 12 and the walls of the casing 8. The strips 32 are 5/8" wide and 1/8" thick and set into the side surface of the table so as to extend 1/16" from the side face of the table 12. These side clearing strips 32 are positioned in line with the clearance strips 31 at the bottom of the table 12. The space between the side of the table 12 and the casing 8 and the clearing strips 32 serve to take away the powdered material expelled by the strips 31 at the bottom of the table and also reduce friction between the table and the casing.

A scraper 33 of flexible rubber or other suitable material is fixed to the vertical edge of the discharge opening 27, in the casing 8, adjacent the scraper 26. This flexible scraper rubs against the side face of the table and projects into the path of the side clearing strips 32, whereby the whole amount of powdered material that passes over the edge of the table is carried away to the return conveyor, leaving the side walls free.

A narrow steel balance strip 34, 1/2" wide by 1/4" think, is recessed into the side of casing 8 above the cut out opening 27 for the overflow chute 28. The top surface of the balance strip 34 is generally flush with the top of the rotating table 12 and is fitted closely against the outer periphery of the table. The side cleaners or strips 32 are terminated the necessary distance below the top of the table 12 to avoid hitting the balance strip 34. This narrow strip 34 serves as a definite check to the overflow phosphate which otherwise would immediately run off the table and down the chute 28. This strip, having no movement, retains some of the excess material which forms a short wall of pulverized phosphate rock that has the effect of retarding the outward flow. As each cup meets scraper 26, the small amount of pressure swell remaining to be cleaned off is forced toward the outlet and a like quantity is forced over the edge of the balance strip. Thus a balanced proportion of phosphate remains before the final leveling scraper 26.

Figure 2:
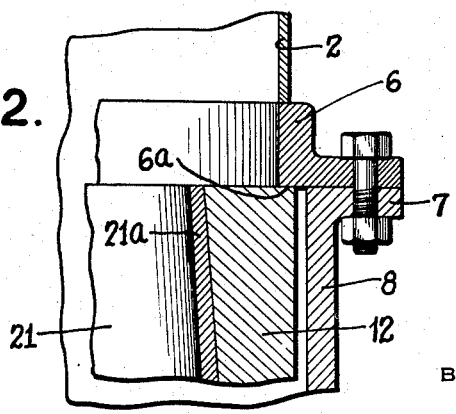
Figure 2 is a fractional enlarged cross section at one edge of the device.

The top ring 6 also acts as a side seal for the table 12 (see Figure 2). The inner face of this top ring 6 overlaps the outside diameter of the top of the table face by about 1/2", thus providing an annular ring 6a, of about 1/4" thickness, giving a light frictional contact between the top ring 6 and the table 12. It is essential to have a running fit here in order to insure that no powdered phosphate rock can get away from the hopper and escape by the side clearance.

In operating the above feeder with ground phosphate rock, the ground material is supplied to the hopper 2 through the opening 1. The hopper 2 is preferably maintained substantially full. After adjusting the screw 18 to give the proper clearance beneath the table 12 and the proper frictional contact between the top surface of the table 12 and the top ring 6, the sprocket 16 is rotated in such a manner as to rotate the table 12 in a counter-clockwise manner (looking down). As each measuring cup 21 advances past the breather 22 the ground material in the hopper enters the leading edge of the cup 21, forcing the air contained therein toward the following edge of the measuring cup and out through the breather 22 and pipe 23. This breather also prevents any extra ground phosphate from being blown into the full measuring cups approaching the discharge opening 20.

As the measuring cup 21 advances it is completely filled with the powdered phosphate material and then passes under the partitions 24 and 25. The compartment between the scrapers 24 and 25 and the end of the outlet hopper 2 is sealed by the cover plate 2a and the seal 6a. This space is soon filled up with phosphate rock and thereafter any excess is forced through the cups 21 and into the space between the bottom of the table 12 and the floor 9. This layer of pulverized phosphate rock is kept alive by the clearance strips 31 and discharged radially into the side space between the wall of the casing 8 and the side surface of the table 12. Here it is picked up by the vertical strips 32 and finally expelled into opening 27 and passes out through the conduit 28. Any other excess phosphate rock that gets between the table 12 and the casing 8 will be carried by the cleaners 32 to the outlet opening 27, and any excess which is not discharged will be scraped off by the rubber scraper 33.

The cleaning strips 31 at the bottom of the table assure a uniformly distributed layer of ground phosphate rock on the floor which serves as a seal. The head of pulverized phosphate rock in the hopper 2 causes pressure swells on the surface of the cups as they emerge from the hopper. As hereinbefore pointed out, the scrapers 24 and 25 constantly force a small amount of this material through the bottom of the cups, thus always keeping the said seal alive and insuring that the cups are quite full until they pass over the discharge outlet.

As each accurately filled cup 21 passes over the discharge opening 20 a regulated quantity of ground phosphate rock is completely discharged into the pipe 20. The tapered shape of the cups 21 avoids sticking of the powdered phosphate rock and reduces the tendency to wear the lining. Any excess of ground phosphate rock on the top of the table is directed by the cleaning arm 29 toward the empty measuring cup approaching the hopper.

The measuring cups 21 are so positioned that one is entering the space beneath the hopper as the opposite one leaves it. The speed of rotation of the table 12 is such as to keep the phosphate flowing continuously, thus providing for a constant movement of phosphate rock in the hopper feeding the measuring cups and minimizing bridging of the ground phosphate. The speed of the table containing the measuring cups and the number and position of the measuring cups provided may be arranged to insure the proper supply of powdered material for the particular use to which it is to be applied. In the event a variation in the rate of supply is desired, for example, when a phosphate rock of different specific gravity is used, the rate of feed may be altered by varying the speed of rotation of the table 12. This may be accomplished, for example, by simply altering the diameter of the sprocket 16.

It is obvious that many variations may be made in the utilization of the invention described above and in giving an illustration of it, it is not intended to restrict the invention to the particular embodiment shown. For example, it is quite obvious that with different materials different clearances may be desired or that different arrangements of the measuring cups and of the hopper or its outlet, the breather, scrapers and discharge outlet may be desirable. The terms used in describing this invention have been used as terms of description and not as terms of limitation and all equivalents of the terms used are intended to be included within the scope of the appended claims.

We claim:

1. A device for feeding regulated quantities of finely divided material comprising a hopper, a stationary table below said hopper and having a discharge opening spaced from the hopper outlet, a movable table on said stationary table having measuring apertures therein adapted to pass under the hopper outlet and carry measured amounts of material from the hopper to said discharge opening, a separate surplus depository between the hopper and said discharge opening through which surplus material may be discharged and means for conducting such surplus material toward said surplus depository.

2. A device for feeding regulated quantities of finely divided material comprising a hopper, a stationary table below said hopper and having a discharge opening spaced from the hopper outlet, a movable table on said stationary table having measuring apertures therein adapted to pass under the hopper outlet and carry measured amounts of material from the hopper to said discharge opening, a surplus depository between the hopper and said discharge opening through which surplus material may be discharged, means for conducting such surplus material toward said surplus depository, said means including a scraper adapted to scrape the surplus material from the top of said movable table and toward said surplus depository.

3. A device for feeding regulated quantities of finely divided material comprising a hopper, a stationary casing below said hopper and having a discharge opening spaced from the hopper outlet, a movable table in said casing having measuring apertures therein adapted to pass under the hopper outlet and carry measured amounts of material from the hopper to said discharge opening, an outlet in said casing between the hopper and said discharge opening through which surplus material may be discharged, means for conducting such surplus material toward said casing outlet, including a scraper adapted to scrape the surplus material from the top of said table and toward the outer rim thereof, and a cover over said table adjacent and in front of said scraper.

4. A device for feeding regulated quantities of finely divided material comprising a hopper, a stationary casing below said hopper and having a discharge opening spaced from the hopper outlet, a movable table in said casing having measuring apertures therein adapted to pass under the hopper outlet and carry measured amounts of material from the hopper to said discharge opening, an outlet in said casing between the hopper and said discharge opening through which surplus material may be discharged, means for conducting such surplus material toward said casing outlet, including a plurality of scrapers extending across the top of said table and adapted to progressively scrape surplus material therefrom toward the outer rim of said table.

5. A device for feeding regulated quantities of finely divided material comprising a hopper, a stationary casing below said hopper and having a discharge opening spaced from the hopper outlet, a movable table in said casing having measuring apertures therein adapted to pass under the hopper outlet and carry measured amounts of material from the hopper to said discharge opening, an outlet in said casing between the hopper and said discharge opening through which surplus material may be discharged, said table being separately mounted and spaced from the bottom of the casing and having means on its bottom surface for agitating the material under the table and conducting a portion of it toward the said casing outlet.

6. A device for feeding regulated quantities of finely divided material comprising a hopper, a stationary casing below said hopper and having a discharge opening spaced from the hopper outlet, a movable table in said casing having measuring apertures therein adapted to pass under the hopper outlet and carry measured amounts of material from the hopper to said discharge opening, an outlet in said casing between the hopper and said discharge opening through which surplus material may be discharged, said table being separately mounted and spaced from the bottom of the casing and having means on its bottom surface for agitating the material under the table and conducting a portion of it toward the said casing outlet, and a scraper adapted to scrape surplus material from the top of said table and toward said casing outlet.

7. A device for feeding regulated quantities of finely divided material comprising a hopper, a stationary casing below said hopper and having a discharge opening spaced from the hopper outlet, a movable table in said casing having measuring apertures therein adapted to pass under the hopper outlet and carry measured amounts of material from the hopper to said discharge opening, an outlet in said casing between the hopper and said discharge opening through which surplus material may be discharged, said table being spaced inwardly from the side walls of the casing, and means for conducting surplus material toward said casing outlet.

8. A device as defined in claim 7 in which the table is in the form of a disc and the casing is provided with an annular flange extending over the periphery of said disc and thereby sealing the annular space between said disc and casing.

9. A device for feeding regulated quantities of finely divided material comprising a hopper, a stationary casing below said hopper and having a discharge opening spaced from the hopper outlet, a movable table in said casing having measuring apertures therein adapted to pass under the hopper outlet and carry measured amounts of material from the hopper to said discharge opening, an outlet in said casing between the hopper and said discharge opening through which surplus material may be discharged, said table being spaced inwardly from the side walls of the casing and having vanes on its side walls extending toward the side walls of the casing, and means for conducting surplus material toward said casing outlet.

10. A device for feeding regulated quantities of finely divided material comprising a hopper, a stationary casing below said hopper and having a discharge opening spaced from the hopper outlet, a movable table in said casing having measuring apertures therein adapted to pass under the hopper outlet and carry measured amounts of material from the hopper to said discharge opening, an outlet in said casing between the hopper and said discharge opening through which surplus material may be discharged, said table being spaced inwardly from the side walls of the casing and having vanes on its side walls extending toward the side walls of the casing, and a scraper adapted to scrape the surplus material from the top of said table and toward said casing outlet.

11. A device for feeding regulated quantities of finely divided material comprising a hopper, a stationary casing below said hopper and having a discharge opening spaced from the hopper outlet, a movable disc-like table in said casing having measuring apertures therein adapted to pass under the hopper outlet and carry measured amounts of material from the hopper to said discharge opening, an outlet in said casing between the hopper and said discharge opening through which surplus material may be discharged, said table being spaced inwardly from the side walls of the casing and having vanes on its side walls extending toward the side walls of the casing, a scraper adapted to scrape surplus material from the top of said table and toward the outer rim of said table, and a cover over said table adjacent and in front of said scraper.

12. A device as defined in claim 11 in which said casing is provided with an annular flange extending over the periphery of said disc and thereby sealing the annular space between said disc and casing.

13. A device as defined in claim 11 in which the table is spaced above the casing and vanes are provided on the under surface of the table adapted to move material toward the outer ring of the table.

14. A device for feeding regulated quantities of finely divided material comprising a hopper having a semi-annular outlet, a stationary floor having a portion positioned below said outlet and having a discharge opening in another portion, a rotatable disc-like table positioned above said floor and having a plurality of apertures extending through it, said disc upon rotation being adapted to convey measured quantities of the material from the hopper outlet to the discharge opening, in which device the table is raised slightly above the floor and a casing surrounds the outer surface of the table and is slightly spaced therefrom, said casing having an overflow outlet, vanes extending from the bottom and sides of said table to direct powdered material toward said overflow outlet and a flexible resilient material adapted to bear upon and flip over the vanes on the outside surface of said disc.

FRANK CECIL JONES.
TERENCE GUILFOYLE.